Patented Oct. 28, 1947

2,429,855

UNITED STATES PATENT OFFICE 2,429,855

COBALT AMINATION CATALYST

John W. Teter, Chicago, Ill., assignor to Sinclair Refining Company, New York, N. Y., a corporation of Maine No Drawing. Application January 29, 1946, Serial No. 644,185

2 Claims. (Cl. 252—207)

This invention relates to an improved catalyst particularly effective in selectively promoting amination reactions, especially the amination of olefins by treatment with ammonia at elevated temperatures. More particularly the invention relates to a composite catalytic mass comprising metallic cobalt dispersed in or suspended on a so-called carrier.

Cobalt has previously been used as a catalyst in various chemical processes. Its use in the form of a suspension on a carrier, for instance conventional kieselguhr, has been suggested as a catalyst for hydrogenation reactions.

I have found cobalt to be a particularly effective amination catalyst. However, I have discovered that the effectiveness as amination catalysts of suspensions of cobalt on so-called carriers, particularly their effectiveness in selectively promoting the amination of olefins by ammonia at elevated temperatures in the production of nitriles, is to a large extent dependent upon the characteristics of the so-called carrier.

The amination of olefins by treatment with ammonia in the presence of a catalyst is favorably influenced by elevated temperatures. Unfortunately, undesirable side reactions such as cracking, polymerization and hydrogenation of the olefins are also promoted by elevated temperatures. By these undesirable side reactions the olefin reactant is dissipated and the organic nitrogen compound yields of the process materially reduced.

Some of the so-called carriers upon which it has been suggested that metallic catalysts be suspended in the preparation of catalytic masses appear themselves to be active catalysts of cracking, hydrogenation or polymerization reactions. Suspensions of cobalt on some of the conventional carriers also appear to be active catalysts of these undesirable reactions. I have found that their presence in the amination reaction zone substantially promotes these competing side reactions.

It is an object of the present invention to provide an improved cobalt catalyst effective in promoting amination but which will retard or at least not materially promote competing side reactions such as previously mentioned.

The catalysts of my present invention combine both of these desirable characteristics, that is they are highly selective with respect to amination reactions. By their use in processes involving the amination of olefins at elevated temperatures, the extent to which these objectionable competing reactions occur is materially reduced.

I cannot state with certainty whether the advantageous results obtained through the use of my improved catalysts in such amination processes are due to the characteristics of the carrier per se or whether they are due to the way in which the metallic cobalt is deposited thereon by reasons of the physical and chemical characteristics of the carrier. However, I have found that cobalt catalysts similarly prepared, except for the substitution of conventional carriers are substantially less selective with respect to amination reactions than are the improved catalysts of my present invention.

I have also found that the effectiveness and selectivity of the catalyst prepared in accordance with my present invention are substantially influenced by the concentration of the cobalt catalyst present in the catalytic mass.

Not only are my improved catalysts more selective in amination reactions but they possess improved characteristics with respect to retention of their selective catalytic properties and improved characteristics with respect to their susceptibility to regeneration and to pelleting and their ability to withstand conditions of use and regeneration without objectionable crushing or disintegration of the pelleted mass.

The various materials which have previously been used or suggested as carriers for catalysts differ widely as to their physical and chemical properties. Generally, their value has been attributed to their extensive surface areas.

From my comprehensive research concerning the use in amination reactions of metallic catalysts suspended on various carriers, it appears that the effectiveness of such catalytic masses is largely dependent upon some correlation of properties of the metallic catalyst and of the carrier, not fully understood. The complexity of the problem is apparent when it is appreciated that, in addition to surface areas and chemical composition, these carriers differ as to crystalline structure, particle size, shape, densities, porosity and the size, shape and type of their cavities.

I have found that the use of carriers characterized by maximum surface areas does not necessarily result in most effective amination catalysts. The surface area of composite catalytic masses comprising cobalt suspended on a carrier is often much greater than the surface area of the carrier itself, but usually appears to depend somewhat upon the surface area of the carrier. However, I have found that a composite catalytic mass comprising cobalt and having maximum surface area is not necessarily the most effective in amination reactions. The composite catalytic mass should be so constituted as to minimize the competing reactions while exerting maximum amination activity. The improved selectivity of the catalysts of my present invention appears to result from a unique combination of the characteristics of the metallic catalysts and of the carrier.

Since catalytic masses of the type described become less active after a period of use and require regeneration to restore their activity, the susceptibility of such catalyst to regenerative treatment is of major practical importance. I have found that the susceptibility of such catalytic masses to regeneration also depends to a considerable extent upon the characteristics of the carrier.

The material which I use as the carrier or support for the cobalt catalyst in accordance with my present invention is prepared by calcining a synthetic hydrated magnesium silicate such as that resulting from reaction in aqueous media of either a synthetically prepared hydrated calcium silicate or a natural calcium silicate of high purity with a soluble magnesium salt such as magnesium chloride. Typical of such synthetic hydrated magnesium silicate which I have used with advantage is the currently commercial product, marketed under the trade name "Magnesol" by the Magnesol Company of New York, New York, in which the molar ratio of $SiO_2$ to $MgO$ is approximately 2 and which has a surface area of about 110–115 square meters per gram, as determined by the method hereinafter described. The chemical analysis of this material has been found to be approximately as follows, by weight and on the dry basis:

| | Per cent |
|---|---|
| $SiO_2$ | 59.8 |
| $MgO$ | 38.1 |
| $CaO$ | 1.87 |
| $Na_2O + K_2O$ | 0.24 |

The fineness of sub-division of this material is as follows:

| Mesh Size | Per cent |
|---|---|
| 60 and less | 1.65 |
| 60–100 | 1.98 |
| 100–200 | 12.92 |
| 200–300 | 19.90 |
| 300 up | 62.04 |

In the calcination or heat treatment of the hydrated magnesium silicate, the material is heated at temperatures between 1200–1300° F. for a period of about 2 hours or until the content of volatile matter is reduced to less than about 5%. As a consequence of the treatment, which may be carried out in any suitable equipment such as a muffle furnace, the surface area of the material as well as its content of volatile matter is greatly reduced. The preferred product of the calcination contains only about 2.5% volatile matter, which is equivalent to a loss of weight of about 25%.

The catalytic mass of my invention comprising the heat-treated synthetic magnesium silicate as carrier may be prepared with advantage as follows: A slurry is formed by adding the magnesium silicate to an aqueous solution of a suitable precipitant, such as sodium carbonate. The slurry is then mechanically treated to break up any lumps of the carrier material. Such treatment may involve washing the slurry through a screen in which event excess water must be subsequently removed from the slurry as by evaporation. Following the de-lumping operation an aqueous solution of cobaltous sulfate heptahydrate is added to the slurry with stirring over a half hour period, both the solution and slurry being maintained at a temperature of about 190° F. After the final addition of the cobalt sulfate solution, the mixture is stirred for an additional 30 minutes or so and is then filtered. The filter cake, after drying, is pulverized and washed by repeatedly re-slurrying it in distilled water and filtering until an analysis of the wet cake shows that the $SO_4^=$ content has dropped to a satisfactory level. The cake is then dried, ground to the desired particle size and calcined at a temperature of about 650–750° F. to decompose the precipitated cobalt carbonates. The calcined product comprising cobalt as cobalt oxide may be pelleted using any suitable binder or the binder may be omitted. The use of a binder is advantageous as increasing the crushing strength of the pelleted product and there is little effect on the activity of the catalyst. Before or after the pelleting, the catalyst material is treated with hydrogen or a hydrogen-containing gas at an elevated temperature and for a period of time sufficient to convert a substantial amount of the deposited cobalt oxide to metallic cobalt.

In the preparation of my catalyst mass, it will be understood, that I may start with cobalt compounds other than cobalt sulfates. Thus, in lieu of the cobaltous sulfate septahydrate I may employ cobalt acetate tetrahydrate, for example.

The proportions of the cobalt compound and of the precipitant used depends on the desired concentration of the metallic catalyst with respect to the heat-treated carrier. I have found that the catalyst mass has the maximum amination activity when prepared to contain about 50% by weight of cobalt, but satisfactory results are obtainable anywhere within the limits of 40–60% cobalt. In preparing the catalyst mass containing approximately 50% metallic cobalt, I generally proceed as follows: 2.18 lbs. of Magnesol previously heat-treated for 2 hours at 1250° F. is added to a solution consisting of 4 lbs. of sodium carbonate in 2 gallons of water. The resulting slurry is washed through a 50 mesh screen to break up agglomerates of the carrier material formed as a consequence of the heat treatment. After evaporation of the wash water, the slurry is heated to 190° F., whereafter a heated solution (190° F.) of cobaltous sulfate heptahydrate in 2 gallons of water is gradually added, preferably in equal increments, over a half hour period with constant stirring. Following addition of the last increment of the cobaltous sulfate solution, the mixture, maintained at 190° F., is stirred for an additional half hour. It is then filtered and the filter cake dried in a steam chest. Thereafter the dried cake is pulverized and thoroughly washed with distilled water to remove $SO_4^=$, the washing being carried out by repeatedly slurrying in the distilled water and filtering. The wet cake from the final wash, after drying, is ground to pass a 30 mesh screen and the ground material calcined for about 2 hours at 660° F. The calcined powder analyzing usually not over 0.30% Na and 0.10% $SO_4$ on an ignited basis is admixed with 4% graphite by stirring and tumbling, pelleted, and reduced with hydrogen at 650–750° F.

Pelleting agents other than graphite which may be employed according to the invention include, for example, rosin, starch, and stearic acid. In using rosin, 3% of a rosin of a particle size which will pass a 50 mesh screen, is intimately admixed with the finely divided catalyst mass by tumbling and stirring. The powdered material is then pelleted to form thin, hard pellets which are subsequently ground and screened. The resulting fine granular material, of a particle size between 30 and 50 mesh is then repelleted, ground and screened as before. To the resultant granular material there is added an additional amount of rosin, for example about 1%, and the mixture again repelleted. The final pellets before reduction treatment are dried in a stream of nitrogen for about 16 hours at a temperature of 700° F.

Despite the reduction in surface area which obtains as a result of the pre-treatment of the carrier material my catalyst is much more active in promoting amination reactions than a cobalt catalyst in which the carrier is a synthetic magnesium silicate which has not been subjected to such pre-treatment. Moreover, the competing reactions of cracking and polymerization are greatly reduced. The activity and selectivity of my catalyst containing 50% cobalt as compared with a cobalt synthetic magnesium silicate catalyst identically prepared except that the carrier was not pre-treated in the manner of my invention is shown in the following table which also shows the differences between the physical characteristics of the two carriers:

Table

| Carrier | Loss of Weight on Ignition | Area, m.²/gm. | | Activity | Selectivity |
| --- | --- | --- | --- | --- | --- |
| | | Carrier | Metal | | |
| Untreated Magnesol | Per cent 24.3 | 112.6 | 52.9 | 12.6 | 1.14 |
| Heat-treated Magnesol | 2.45 | 20.3 | 46.0 | 20.9 | 0.05 |
| Heat-treated Magnesol | 2.45 | 20.3 | 34.9 | 18.9 | 0.12 |

The surface area values, stated in square millimeters per gram, are based on the amount of stearic acid adsorbed by the material from a benzene solution and the general assumption that the entire surface of the material is covered with a mono-molecular layer of stearic acid in such a state of orientation and packing that each molecule occupies about 20Å.$^2$, as has been previously discussed rather generally in the literature. Briefly, the apparatus employed consists of a catalyst-adsorption tube having an upper and lower compartment, the latter being adapted to be evacuated and heated. A sample of the material, the surface area of which is to be measured, usually a 2 to 3 gram sample, is weighed out and transferred to the lower compartment of the adsorption tube. The tube is then weighed, heated and evacuated and the lower compartment sealed. For approximately 24 hours prior to sealing, the temperature is maintained slightly under 1000° F. and its pressure at 50–100 microns. An anhydrous solution of stearic acid in carefully purified benzene is then pipetted into the unsealed upper compartment of the tube and a thin partition separating the upper from the lower compartment of the tube broken. The stearic acid-benzene solution serves as a seal for the evacuated compartment of the tube until the solid material is well covered with the solution. The lower portion of the tube is then separated from the upper portion, tightly sealed and rotated end-over-end at the rate of about 80 R. P. M. for approximately 7 hours. It is then allowed to settle for 15 hours or more until the supernatant liquid is clear. A sample of the supernatant liquid is then removed and its stearic acid concentration compared with the concentration of the original solution. From these values the amount of stearic acid adsorbed by the solid material and the surface area of the solid material are then calculated.

The activity and selectivity values in the table are based on the results of runs in which the charge material passed into contact with the catalyst consisted of ammonia and a $C_3$ hydrocarbon mixture containing about 40–50% propylene and in which the product was calculated as propionitrile on the basis of nitrogen analysis. These several runs were carried out at a temperature of about 640° F.–650° F. and under a pressure of about 1500 lbs. per square inch using about 10 moles of ammonia for each mole of olefin in the hydrocarbon feed. The selectivity values represent the ratio of the total weight of hydrocarbon polymer to the calculated weight of propionitrile in the reaction product.

The figures in the table show that the catalyst of the invention is at least a third again more active and at least 9–10 times more selective than the catalyst prepared using uncalcined synthetic magnesium silicate.

In addition to its other advantages, my catalyst is less prone to sinter than catalysts heretofore employed in amination reactions. Thus, in an accelerated sintering test involving 168 hours of heat treatment in a slow stream of nitrogen at 900° F. the reduction in surface area, an accurate measure of resistance to sintering, was only 14% as compared to 36% and 45% in the case of cobalt catalysts of the cobalt on diatomaceous earth type. The latter catalysts were prepared for the test in a manner similar to the catalyst of my invention.

My catalyst is with advantage used as a fixed bed through which an admixture of the reactants are passed or with which the reactants are otherwise brought into contact. In a process of this type I prefer to use the catalyst in a pelleted form. However, my improved catalyst is also applicable to amination processes of the type in which the catalyst in finely-divided form is passed continuously to the reaction zone in suspension in one of the reactants or a mixture thereof.

In either type of operation it eventually becomes necessary to regenerate the catalyst to restore its selective amination activity which gradually diminishes with continued use. This regeneration may readily be effected by periodically subjecting the degenerated catalyst to an atmosphere of hydrogen at a temperature of about 650° F. to 750° F., and at atmospheric pressure for about 12 to 50 hours, or at elevated pressures in the range of 1000 pounds per square inch or higher for shorter periods such as 1 to 6 hours.

I claim:

1. An amination catalyst consisting essentially of about 40–60% by weight calculated as metallic cobalt of reduced cobalt oxide supported on a carrier of synthetic magnesium silicate in which the molar ratio of $SiO_2:MgO$ is approximately 2:1 which prior to the deposition of cobalt oxide thereon has been subjected to heat treatment at 1200° F.–1300° F. to reduce its content of volatile matter to less than about 5%.

2. An amination catalyst consisting essentially of about 40–60% by weight calculated as metallic cobalt of reduced cobalt oxide supported on a carrier of synthetic magnesium silicate in which the molar ratio of $SiO_2:MgO$ is approximately 2:1 which prior to the deposition of cobalt oxide thereon has been subjected to heat treatment at 1200° F.–1300° F. to reduce its content of volatile matter to about 2.45%.

JOHN W. TETER.

REFERENCES CITED

The following references are of record in the file of this patent:

UNITED STATES PATENTS

| Number | Name | Date |
|---|---|---|
| 2,398,899 | Teter | Apr. 23, 1946 |
| 2,406,929 | Teter | Sept. 3, 1946 |